(12) United States Patent
Wang et al.

(10) Patent No.: US 10,879,706 B2
(45) Date of Patent: Dec. 29, 2020

(54) BATTERY BALANCING CIRCUIT BALANCING VOLTAGES BETWEEN BATTERY UNITS WITH A FLY CAPACITOR

(71) Applicant: Chengdu Monolithic Power Systems Co., Ltd., Chengdu (CN)

(72) Inventors: Rui Wang, Chengdu (CN); Min Xu, Chengdu (CN); Qiming Zhao, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/032,004

(22) Filed: Jul. 10, 2018

(65) Prior Publication Data
US 2020/0021118 A1 Jan. 16, 2020

(30) Foreign Application Priority Data
Jul. 11, 2017 (CN) .......................... 2017 1 0564786

(51) Int. Cl.
*H02J 7/00* (2006.01)
*H01M 10/42* (2006.01)
*H01M 10/44* (2006.01)

(52) U.S. Cl.
CPC ......... *H02J 7/0014* (2013.01); *H01M 10/425* (2013.01); *H01M 10/441* (2013.01); *H02J 7/0024* (2013.01); *H01M 2010/4271* (2013.01)

(58) Field of Classification Search
USPC ........................................................ 320/118
See application file for complete search history.

(56) References Cited

U.S. PATENT DOCUMENTS

| | | | | |
|---|---|---|---|---|
| 7,288,919 B2* | 10/2007 | Morita | ................... | H02J 7/0016 320/116 |
| 8,164,341 B2* | 4/2012 | Jaeger | ................... | H02J 7/0021 324/433 |
| 8,203,308 B1* | 6/2012 | Guo | ....................... | B60L 3/0069 320/119 |
| 8,896,278 B2 | 11/2014 | Ouyang et al. | | |
| 8,976,547 B2 | 3/2015 | Ren et al. | | |
| 2010/0277123 A1* | 11/2010 | Lim | ...................... | H02J 7/0016 320/116 |
| 2011/0169452 A1* | 7/2011 | Cooper | ................ | G01R 31/396 320/116 |
| 2012/0212182 A1 | 8/2012 | Li | | |
| 2012/0293129 A1* | 11/2012 | Naghshtabrizi | ....... | H02J 7/0016 320/118 |
| 2013/0015820 A1* | 1/2013 | Kim | ...................... | H02J 7/0019 320/128 |

(Continued)

*Primary Examiner* — Samuel Berhanu
(74) *Attorney, Agent, or Firm* — Perkins Coie LLP

(57) ABSTRACT

A battery balancing method and circuit for balancing the voltages between battery units with a fly capacitor. In a first time period of a switching cycle, the first battery unit is used to charge the fly capacitor or the first battery unit is used to discharge the fly capacitor, depending on which of the first battery unit and the fly capacitor having a larger voltage value; and in a second time period of the switching cycle, the second battery unit is used to charge the fly capacitor or the second battery unit is used to discharge the fly capacitor, depending on which of the second battery unit and the fly capacitor having a larger voltage value.

14 Claims, 8 Drawing Sheets

(56) References Cited

U.S. PATENT DOCUMENTS

| | | | |
|---|---|---|---|
| 2013/0015821 A1* | 1/2013 | Kim .................... | H02J 7/0019 320/128 |
| 2014/0049224 A1* | 2/2014 | Hua .................... | H02J 7/0068 320/136 |
| 2014/0111160 A1* | 4/2014 | Nozawa ............... | G01R 31/007 320/118 |
| 2014/0361746 A1* | 12/2014 | Saito .................... | H02J 7/0031 320/118 |

* cited by examiner

US 10,879,706 B2

BATTERY BALANCING CIRCUIT BALANCING VOLTAGES BETWEEN BATTERY UNITS WITH A FLY CAPACITOR

CROSS-REFERENCE TO RELATED APPLICATIONS

This application claims the benefit of CN application No. 201710564786.3, filed on Jul. 11, 2017, and incorporated herein by reference.

FIELD OF THE INVENTION

The present invention relates generally to electronic circuits, more specifically but not exclusively to the battery balancing circuits and the methods thereof.

BACKGROUND OF THE INVENTION

In a battery pack (or a battery management system) comprising several serially coupled battery units, the lifetime of the battery units shortens and the capacity of the battery pack decreases when the voltages of the battery units are not equal to each other (i.e., being imbalanced).

Thus, there's a need to balance the battery units to assure the safe operation and the stability of the battery pack.

SUMMARY

Embodiments of the present invention are directed to a battery balancing method for balancing the voltages of a first battery unit and of a second battery unit with a fly capacitor, comprising: in a first time period of a switching cycle, charging the fly capacitor from the first battery unit or discharging the fly capacitor to the first battery unit, depending on which of the first battery unit and the fly capacitor having a larger voltage value; and in a second time period of the switching cycle, charging the fly capacitor from the second battery unit or discharging the fly capacitor to the second battery unit, depending on which of the second battery unit and the fly capacitor having a larger voltage value.

Embodiments of the present invention are also directed to a battery balancing control circuit for balancing the voltages of a first battery unit and of a second battery unit with a fly capacitor, comprising a first switching circuit and a second switching circuit, wherein in a first time period of a switching cycle, the first switching circuit is switched on and the second switching circuit is switched off so as to charge the fly capacitor from the first battery unit or to discharge the fly capacitor to the first battery unit, depending on which of the first battery unit and the fly capacitor having a larger voltage value; and in a second time period of the switching cycle, the first switching circuit is switched off and the second switching circuit is switched on so as to charge the fly capacitor from the second battery unit or to discharge the fly capacitor to the second battery unit, depending on which of the second battery unit and the fly capacitor having a larger voltage value.

Embodiments of the present invention are further directed to a battery balancing circuit, comprising a first battery unit and a second battery unit; a fly capacitor, wherein the battery balancing circuit is configured to balance the voltages of the first battery unit and of the second battery unit with the fly capacitor; and a battery balancing control circuit configured to comprise a first switching circuit and a second switching circuit, wherein in a first time period of a switching cycle, the first switching circuit is switched on and the second switching circuit is switched off so as to charge the fly capacitor from the first battery unit or to discharge the fly capacitor to the first battery unit, depending on which of the first battery unit and the fly capacitor having a larger voltage value; and in a second time period of the switching cycle, the first switching circuit is switched off and the second switching circuit is switched on so as to charge the fly capacitor from the second battery unit or to discharge the fly capacitor to the second battery unit, depending on which of the second battery unit and the fly capacitor having a larger voltage value.

DESCRIPTION OF THE DRAWINGS

The present invention can be further understood with reference to the following detailed description and the appended drawings, wherein like elements are provided with like reference numerals.

DESCRIPTION

Figure 1:
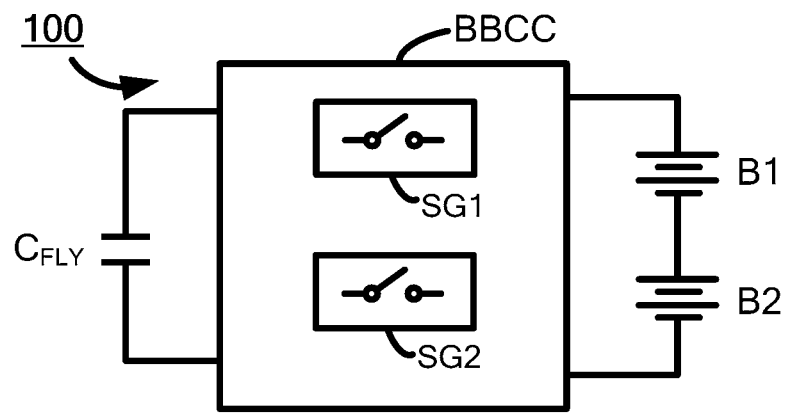
FIG. 1 illustrates a battery balancing circuit 100 in accordance with an embodiment of the present invention.

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or one embodiment combining software and hardware aspects. The following detailed description is, therefore, not to be taken in a limiting sense.

Throughout the specification, the meaning of "a," "an," and "the" may also include plural references.

As can be appreciated, the conductivity and doping of materials or regions disclosed herein may be varied, with appropriate changes to the conductivity and doping of other materials or regions, depending on the application.

FIG. 1 illustrates a battery balancing circuit 100 in accordance with an embodiment of the present invention. As shown in FIG. 1, the battery balancing circuit 100 illustratively comprises a first battery unit B1, a second battery unit B2, a fly capacitor $C_{FLY}$ and a battery balancing control circuit BBCC. When the first battery unit B1 and the second battery unit B2 are imbalanced, i.e., the voltages of the first and second battery units B1 and B2 are not equal, the battery balancing circuit 100 uses the fly capacitor $C_{FLY}$ to balance the first battery unit B1 and the second battery unit B2, that is, to have the voltages of the first and second battery units B1 and B2 equal, under the control of the battery balancing control circuit BBCC. Specifically, the battery balancing control circuit BBCC illustratively comprises a first switching circuit SG1 and a second switching circuit SG2. In the first time period of each switching cycle, the first switching circuit SG1 is turned on and the second switching circuit SG2 is turned off so that the first battery unit B1 operates to charge the fly capacitor $C_{FLY}$, or oppositely, the fly capacitor $C_{FLY}$ operates to discharge the first battery unit B1, depending on which of the first battery unit B1 and the fly capacitor $C_{FLY}$ has a larger voltage value. More specifically, in the first time period of each switching cycle, the conducting path of the first switching circuit SG1 is formed while the conducting path of the second switching circuit SG2 is cut off so that the first battery unit B1 operates to charge the fly capacitor $C_{FLY}$ when the voltage value of the first battery unit B1 is larger than the voltage value of fly capacitor $C_{FLY}$ or the fly capacitor $C_{FLY}$ operates to discharge the first battery unit B1 when the voltage value of the first battery unit B1 is lower than the voltage value of fly capacitor $C_{FLY}$. In the second time period of each switching cycle, the first switching circuit SG1 is turned off and the second switching circuit SG2 is turned on so that the second battery unit B2 operates to charge the fly capacitor $C_{FLY}$, or oppositely, the fly capacitor $C_{FLY}$ operates to discharge the second battery unit B2, depending on which of the second battery unit B2 and the fly capacitor $C_{FLY}$ has a larger voltage value. More specifically, in the second time period of each switching cycle, the conducting path of the first switching circuit SG1 is cut off while the conducting path of the second switching circuit SG2 is formed so that the second battery unit B2 operates to charge the fly capacitor $C_{FLY}$ when the voltage value of the second battery unit B2 is larger than the voltage value of fly capacitor $C_{FLY}$ or the fly capacitor $C_{FLY}$ operates to discharge the second battery unit B2 when the voltage value of the second battery unit B2 is lower than the voltage value of fly capacitor $C_{FLY}$.

It is known from the above description that, the power energy can be transferred between the first battery unit B1 and the second battery unit B2 via the fly capacitor $C_{FLY}$. As a result, the voltage difference between the first battery unit B1 and the second battery unit B2 becomes smaller and zero eventually, that is, the voltage of the first battery unit B1 and the voltage of the second battery unit B2 becomes equal eventually.

With the battery balancing circuit of FIG. 1, the efficiency of balancing two battery units is as high as to be above 95%.

In an embodiment, the first time period and the second time period are two complementary time periods of a switching cycle, that is, the first time period and the second time period together forms a switching cycle. However, in another embodiment, the switching cycle may comprise more intervals besides the first time period and the second time period.

In an embodiment, the energy transfer between the two battery units automatically stops when the voltages of the two battery units reach a balance. However, in another embodiment, the battery balancing can be enabled or stopped by setting an enable function.

Figure 2:
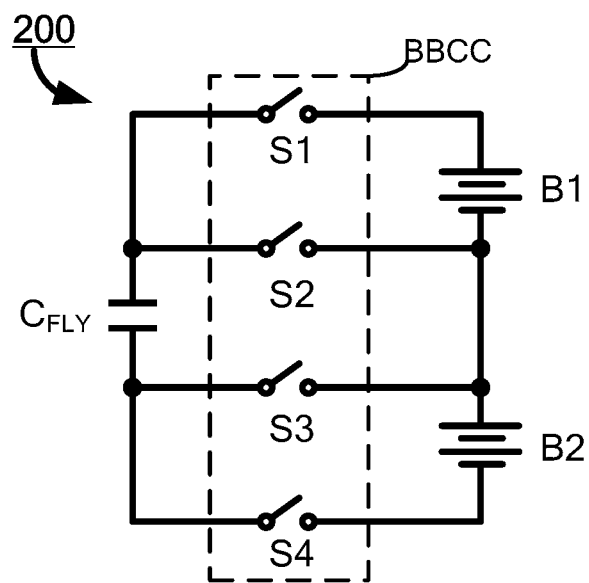
FIG. 2 illustrates a battery balancing circuit 200 in accordance with an embodiment of the present invention.

FIG. 2 illustrates a battery balancing circuit 200 in accordance with an embodiment of the present invention. As shown in FIG. 2, the battery balancing circuit 200 illustratively comprises a first battery unit B1 and a second battery unit B2, a fly capacitor $C_{FLY}$ and a battery balancing control circuit BBCC. Wherein, the first battery unit B1 and the second battery unit B2 each comprise a first terminal (e.g., the positive terminal) and a second terminal (e.g., the negative terminal), and the first terminal of the second battery unit B2 is electrically coupled to the second terminal of the first battery unit B1. The battery balancing control circuit BBCC illustratively comprises a first switching circuit and a second switching circuit. Wherein, the first switching circuit illustratively comprises switches S1 and S3, and the second switching circuit illustratively comprises switches S2 and S4. Switches S1~S4 each comprise a first terminal and a second terminal, wherein the first terminal of the switch S1 is electrically coupled the positive terminal of the first battery unit B1, the first terminal of the switch S2 is electrically coupled to the negative terminal of the first battery unit B1, the first terminal of the switch S3 is electrically coupled to the positive terminal of the second battery unit B2, and the first terminal of the switch S4 is electrically coupled to the negative terminal of the second battery unit B2. The fly capacitor $C_{FLY}$ comprises a first terminal and a second terminal, wherein the first terminal of the fly capacitor $C_{FLY}$ is electrically coupled to the second terminals of the switches S1 and S2, and the second terminal of the fly capacitor $C_{FLY}$ is electrically coupled to the second terminal of the switches S3 and S4.

Figure 3A:
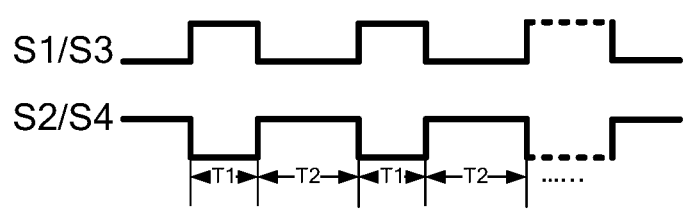
FIG. 3(a)~3(b) illustrate the operation of the battery balancing circuit 200 of FIG. 2.
Figure 3A:
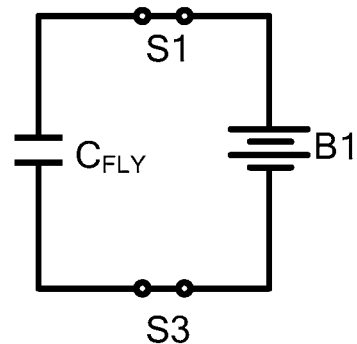
Figure 3B:
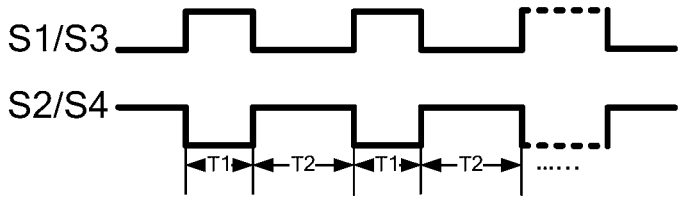
Figure 3B:
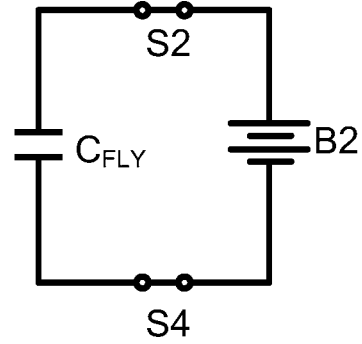

As shown in FIG. 3(a), in a first time period T1 of each switching cycle, the conducting path is formed within the first switching circuit, that is, the switches S1 and S3 are turned on, and the conducting path is cut off within the second switching circuit, that is, the switches S2 and S4 are turned off. As a result, the fly capacitor $C_{FLY}$ is coupled in parallel with the first battery unit B1, and depending on which of the first battery unit B1 and the fly capacitor $C_{FLY}$ has a larger voltage, the first battery unit B1 operates to charge the fly capacitor $C_{FLY}$ or the fly capacitor $C_{FLY}$ operates to discharge the first battery unit B1. As shown in FIG. 3(b), in a second time period T2 of each switching cycle, the conducting path is formed within the second switching circuit, that is, the switches S2 and S4 are turned on, and the conducting path is cut off within the first switching circuit, that is, the switches S1 and S3 are turned off. As a result, the fly capacitor $C_{FLY}$ is coupled in parallel with the second battery unit B2, and depending on which of the second battery unit B2 and the fly capacitor $C_{FLY}$ has a larger voltage, the second battery unit B2 operates to charge the fly capacitor $C_{FLY}$ or the fly capacitor $C_{FLY}$ operates to discharge the second battery unit B2.

The operation of the battery balancing circuit 200 of FIG. 2 comprises a starting phase and a non-starting phase. Details will be described regarding to these two operating phases. In the starting phase, the voltages of the first battery unit B1 and of the second battery unit B2 are much larger than the voltage of the fly capacitor $C_{FLY}$. In the battery balancing circuit 200 of the present invention, in the first time period T1 of each switching cycle of the starting phase, the switches S1 and S3 are turned on and the switches S2 and S4 are turned off so that the first battery unit B1 and the fly capacitor $C_{FLY}$ are coupled in parallel and the first battery unit B1 thereby charges the fly capacitor $C_{FLY}$. In the battery balancing circuit 200 of the present invention, in the second time period T2 of each switching cycle of the starting phase, the switches S2 and S4 are turned on and the switches S1 and S3 are turned off so that the second battery unit B2 and the fly capacitor $C_{FLY}$ are coupled in parallel and the second battery unit B2 thereby charges the fly capacitor $C_{FLY}$. As a result, in the starting phase, the voltage of the fly capacitor $C_{FLY}$ increases gradually from zero through charging the fly capacitor $C_{FLY}$ by the first battery unit B1 and the second battery B2 alternately.

Persons of ordinary skills in the art will recognize that, in the starting phase, the durations of the first time period T1 and the second time period T2 may be preset in accordance with the design requirements. Persons of ordinary skill in the art will also recognize that, in the above description, the fly capacitor $C_{FLY}$ is first charged by the first battery unit B1 and then by the second battery unit B2. However, this should not be interpreted to limit the present invention. In one embodiment, the fly capacitor $C_{FLY}$ may be charged by any one of the first battery unit B1 and the second battery unit B2 first and then by the other one. In another embodiment, the voltages of the first battery unit B1 and the second battery unit B2 may be detected in advance, and the fly capacitor $C_{FLY}$ may be charged by the battery unit between the first battery unit B1 and the second battery unit B2 with a larger voltage value, and then charged by the other one with a smaller voltage value. Persons of ordinary skill in the art will also recognize that, in an embodiment, the end of the staring phase may be judged by setting a judging condition. For example, in an embodiment, the number of the switching cycles of the starting phase may be set, and when the battery balancing circuit 200 operates to the number the switching cycle, the starting phase ends. In another embodiment, the voltage difference between the fly capacitor $C_{FLY}$ and the first battery unit B1 and the voltage difference between the fly capacitor $C_{FLY}$ and the second battery unit B2 are detected, and when the larger one of the above two voltage differences reaches a preset value, the starting phase ends.

Next, detailed description will be given regarding to the operation of the battery balancing circuit 200 working in the non-starting phase, taking the starting voltage of the second battery unit B2 being larger than the starting voltage of the first battery unit B1 when entering the non-starting phase for example. In the first time period T1 of the first switching cycle of the non-starting phase, the conducting path is formed in the first switching circuit, that is, the switches S1 and S3 are turned on, and the conducting path is cut off in the second switching circuit, that is, the switches S2 and S4 are turned off so that the first battery unit B1 is coupled with the fly capacitor $C_{FLY}$ in parallel. In this way, the voltage $V_{FLY}$ of the fly capacitor $C_{FLY}$ becomes equal to the voltage $V_{B1}$ of the first battery unit B1 at the end of the first time period T1, by charging the fly capacitor $C_{FLY}$ with the first battery unit B1. And next, in the second time period T2 of the first switching cycle of the non-starting phase, the conducting path is formed in the second switching circuit, that is, the switches S2 and S4 are turned on, and the conducting path is cut off in the first switching circuit, that is, the switches S1 and S3 are turned off so that the second battery unit B2 is coupled with the fly capacitor $C_{FLY}$ in parallel. In this way, as the starting voltage of the second battery unit B2 is larger than the starting voltage of the first battery unit B1, in other words, as the starting voltage of the second battery unit B2 is larger than the voltage of the fly capacitor $C_{FLY}$ in the second time period T2 of the first switching cycle, the voltage $V_{FLY}$ of the fly capacitor $C_{FLY}$ becomes equal to the voltage $V_{B2}$ of the second battery unit B2 at the end of the second time period T2, by charging the fly capacitor $C_{FLY}$ with the second battery unit B2.

And next, a new switching cycle is entered. In the first time period T1 of this switching cycle, the conducting path is formed in the first switching circuit, that is, the switches S1 and S3 are turned on, and the conducting path is cut off in the second switching circuit, that is, the switches S2 and S4 are turned off so that the first battery unit B1 is coupled with the fly capacitor $C_{FLY}$ in parallel. In this way, as the starting voltage of the second battery unit B2 is larger than the starting voltage of the first battery unit B1, in other words, as the voltage of the fly capacitor $C_{FLY}$ in the first time period T1 of the second switching cycle is larger than the voltage of the first battery unit B1 in the first time period T1 of the second switching cycle, by discharging the fly capacitor $C_{FLY}$ to the first battery unit B1. As a result, the voltage $V_{FLY}$ of the fly capacitor $C_{FLY}$ becomes equal to the voltage VB1 of the first battery unit B1 at the end of the first time period T1. And next, in the second time period T2 of this switching cycle, the conducting path is formed in the second switching circuit, that is, the switches S2 and S4 are turned on, and the conducting path is cut off in the first switching circuit, that is, the switches S1 and S3 are turned off so that the second battery unit B2 is coupled with the fly capacitor $C_{FLY}$ in parallel. In this way, as the starting voltage of the second battery unit B2 is larger than the starting voltage of the first battery unit B1, in other words, as the voltage of the second battery unit B2 in the second time period T2 of the second switching cycle is larger than the voltage of the fly capacitor $C_{FLY}$ in the second time period T2 of the second switching cycle, the voltage $V_{FLY}$ of the fly capacitor $C_{FLY}$ becomes equal to the voltage $V_{B2}$ of the second battery unit B2 at the end of the second time period T2, by discharging the fly capacitor $C_{FLY}$ to the second battery unit B2.

It can be known from the above description, the power energy is transferred from the second battery unit B2 to the first battery unit B1 with the function of the fly capacitor $C_{FLY}$, as a result, the voltage difference between the first battery unit B1 and the second battery unit B2 decreases gradually, and becomes to zero eventually after several switching cycles, that is, the voltage of the first battery unit B1 becomes equal to the voltage of the second battery unit B2.

In an embodiment, the battery balancing circuit 200 enters into the non-starting phase after the starting phase ends. Persons of ordinary skill in the art will recognize that, in the above description, the fly capacitor $C_{FLY}$ is first charged by the first battery unit B1 and then by the second battery unit B2. However, this should not be interpreted to limit the present invention. In one embodiment, the fly capacitor $C_{FLY}$ may be charged by any one of the first battery unit B1 and the second battery unit B2 first and then by the other one.

Persons of ordinary skill in the art will recognize that, the description regarding the operation of the battery balancing circuit 200 in the non-starting phase is given by taking the starting voltage of the second battery unit B2 being larger than the starting voltage of the first battery unit B1 for example, however, when the starting voltage of the second battery unit B2 is lower than the starting voltage of the first battery unit B1, the battery balancing circuit 200 operates similarly, thus the operation will not described herein for simplicity reason.

Figure 4:
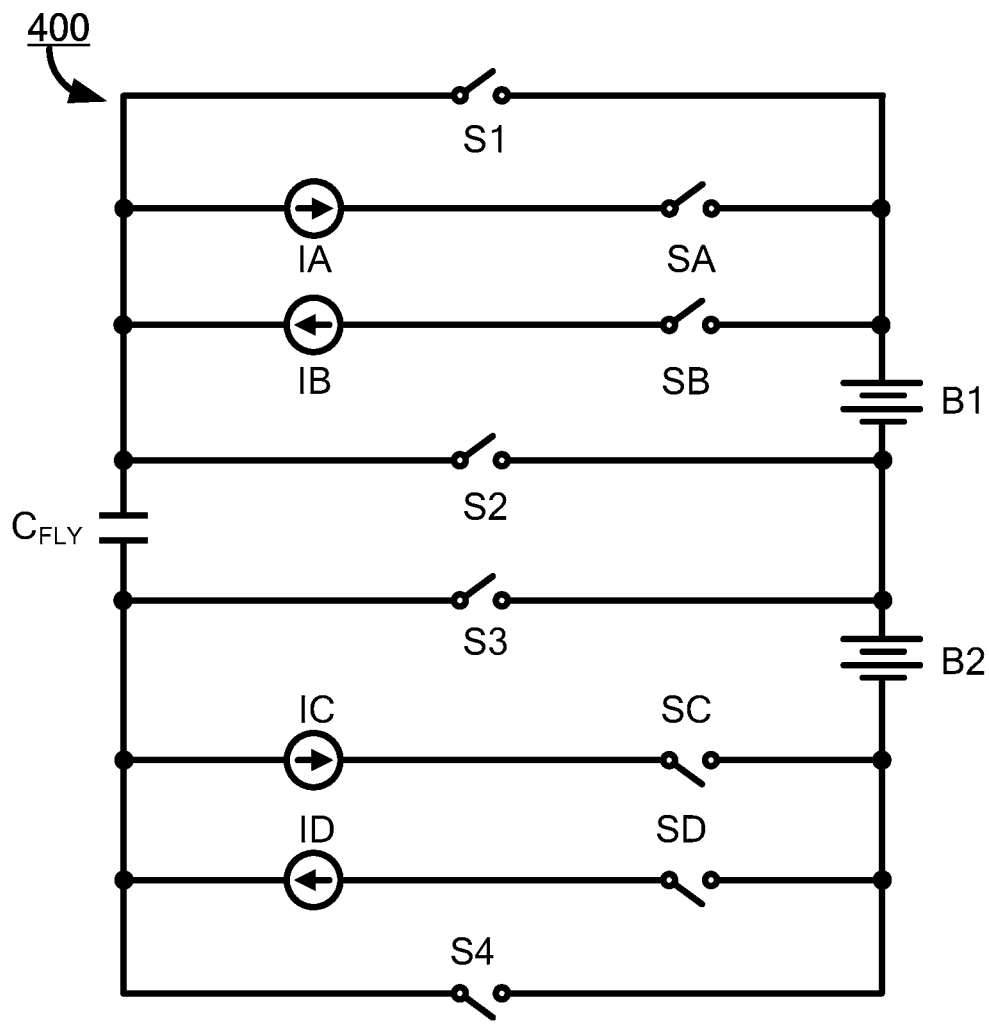
FIG. 4 illustrates a battery balancing circuit 400 in accordance with an embodiment of the present invention.

FIG. 4 illustrates a battery balancing circuit 400 in accordance with an embodiment of the present invention. Compared with the battery balancing circuit 200 of FIG. 2, the battery balancing circuit 400 of FIG. 4 further comprises current sources IA, IB, IC and ID, and switches SA, SB, SC and SD. The serially coupled current source IA and switch SA is coupled between the positive terminal of the first battery unit B1 and the first terminal of the fly capacitor $C_{FLY}$, wherein the current source IA is configured to provide a current flowing from the first terminal of the fly capacitor $C_{FLY}$ to the positive terminal of the first battery unit B1; the serially coupled current source IB and switch SB is coupled between the positive terminal of the first battery unit B1 and the first terminal of the fly capacitor $C_{FLY}$, wherein the current source IB is configured to provide a current flowing from the positive terminal of the first battery unit B1 to the first terminal of the fly capacitor $C_{FLY}$; the serially coupled current source IC and switch SC is coupled between the negative terminal of the second battery unit B2 and the second terminal of the fly capacitor $C_{FLY}$, wherein the current source IC is configured to provide a current flowing from the second terminal of the fly capacitor $C_{FLY}$ to the negative terminal of the second battery unit B2; the serially coupled current source ID and switch SD is coupled between the negative terminal of the second battery unit B2 and the second terminal of the fly capacitor $C_{FLY}$, wherein the current source ID is configured to provide a current flowing from the negative terminal of the second battery unit B2 to the second terminal of the fly capacitor $C_{FLY}$.

Figure 5A:
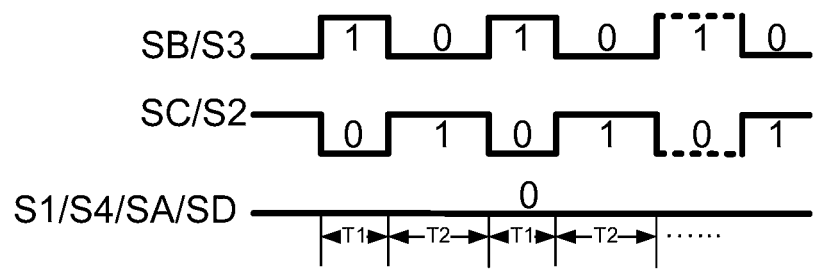
FIG. 5(a)~5(c) illustrates the control scheme and the operation of the battery balancing circuit 400 when it operates in the starting phase.
Figure 5B:
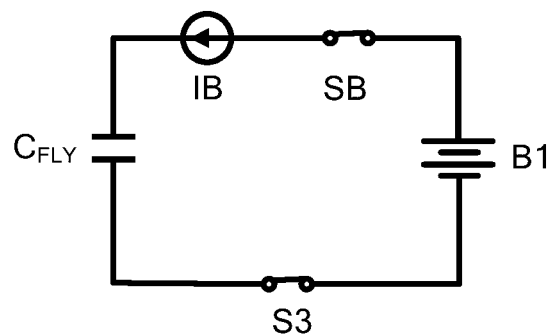
Figure 5C:
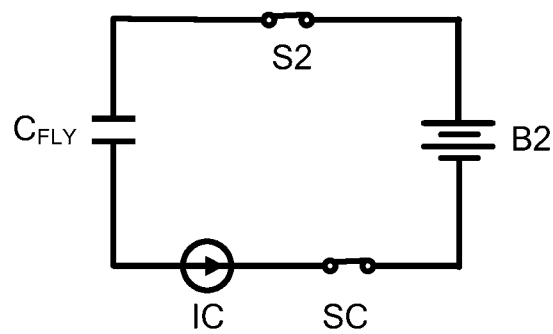

FIG. 5(a)~5(c) illustrates the control scheme and the operation of the battery balancing circuit 400 when it operates in the starting phase. In the starting phase, the voltages of the first battery unit B1 and of the second battery unit B2 are much larger than the voltage of the fly capacitor $C_{FLY}$. In the battery balancing circuit 400, as shown in FIG. 5(a) and FIG. 5(b), in the first time period T1 of each switching cycle in the starting phase, the switches S3 and SB are turned on and the switches S1, S2, S4, SA, SC and SD are all turned off so that the first battery unit B1 charges the fly capacitor $C_{FLY}$ with a charging current value of which is determined by the current source IB. As shown in FIG. 5(a) and FIG. 5(c), in the second time period T2 of each switching cycle in the starting phase, the switches S2 and SC are turned on and the switches S1, S3, S4, SA, SB and SD are all turned off so that the second battery unit B2 charges the fly capacitor $C_{FLY}$ with a charging current value of which is determined by the current source IC.

Persons of ordinary skills in the art will recognize that, in the starting phase, the durations of the first time period T1 and the second time period T2 may be preset in accordance with the design requirements. Persons of ordinary skill in the art will also recognize that, in the embodiment illustrated by FIG. 5(a)~5(c), the fly capacitor $C_{FLY}$ is first charged by the first battery unit B1 and then by the second battery unit B2. However, this should not be interpreted to limit the present invention. In one embodiment, the fly capacitor $C_{FLY}$ may be charged by any one of the first battery unit B1 and the second battery unit B2 first and then by the other one. In another embodiment, the voltages of the first battery unit B1 and the second battery unit B2 may be detected in advance, and the fly capacitor $C_{FLY}$ may be charged by the battery unit between the first battery unit B1 and the second battery unit B2 with a larger voltage value, and then charged by the other one with a smaller voltage value. Persons of ordinary skill in the art will also recognize that, in an embodiment, the end of the staring phase may be judged by setting a judging condition. For example, in an embodiment, the number of the switching cycles of the starting phase may be set, and when the battery balancing circuit 400 operates to the number the switching cycle, the starting phase ends. In another embodiment, the voltage difference between the fly capacitor $C_{FLY}$ and the first battery unit B1 and the voltage difference between the fly capacitor $C_{FLY}$ and the second battery unit B2 are detected, and when the larger one of the above two voltage differences reaches a preset value, the starting phase ends.

As a result, in the starting phase, the voltage of the fly capacitor $C_{FLY}$ increases gradually from zero through charging the fly capacitor $C_{FLY}$ by the first battery unit B1 and the second battery B2 alternately. In this way, although the voltages of the first battery unit B1 and of the second battery unit B2 are much larger than the voltage of the fly capacitor $C_{FLY}$, the current overshooting event can be avoided due to the current limit function of the current sources IB and IC.

Figure 6A:
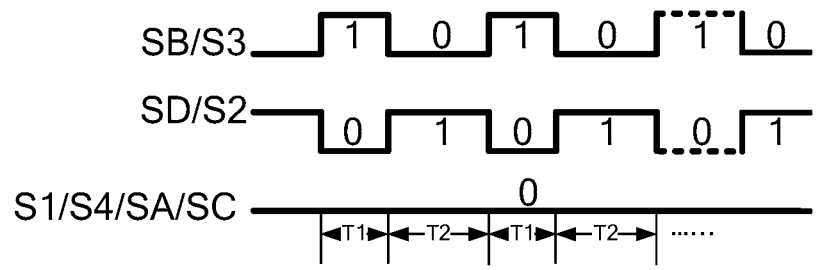
FIG. 6(a)~6(c) illustrate the control scheme and the operation of the battery balancing circuit 400 working in the non-starting phase when the voltage of the first battery unit B1 is larger than the voltage of the second battery unit B2 and when the voltage difference between the first battery unit B1 and the second battery unit B2 is larger than the current limiting threshold.
Figure 6B:
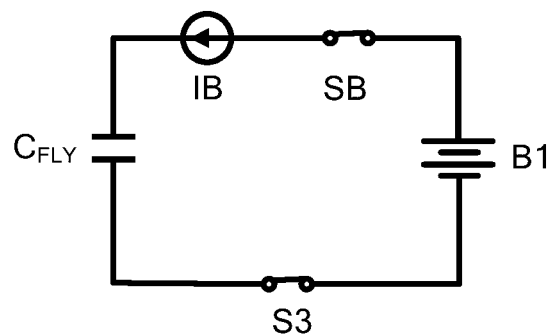
Figure 6C:
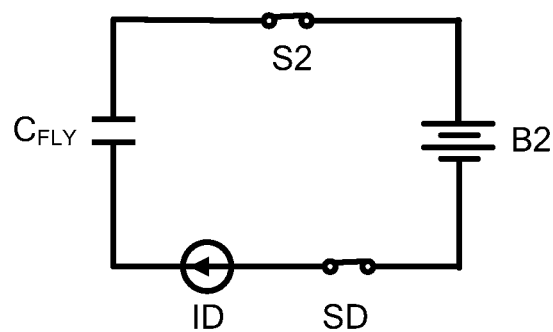
Figure 7A:
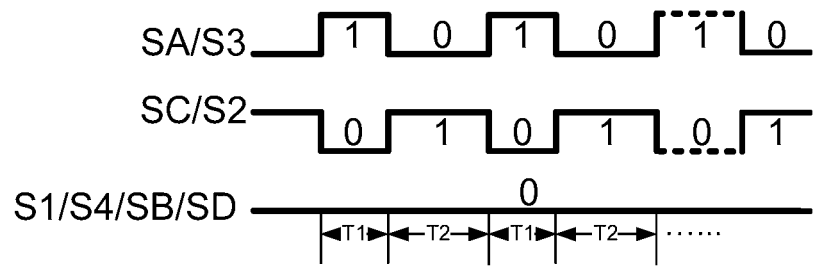
FIG. 7(a)~7(c) illustrate the control scheme and the operation of the battery balancing circuit 400 working in the non-starting phase when the voltage of the second battery unit B2 is larger than the voltage of the first battery unit B1 and when the voltage difference between the second battery unit B2 and the first battery unit B1 is larger than the current limiting threshold.
Figure 7B:
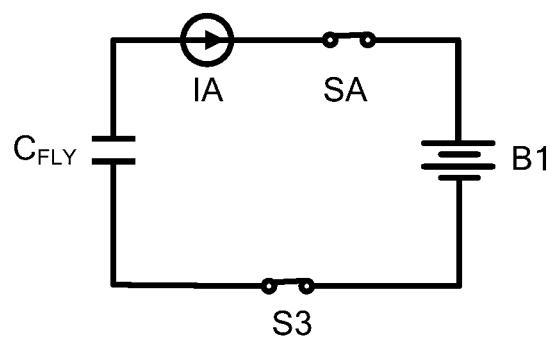
Figure 7C:
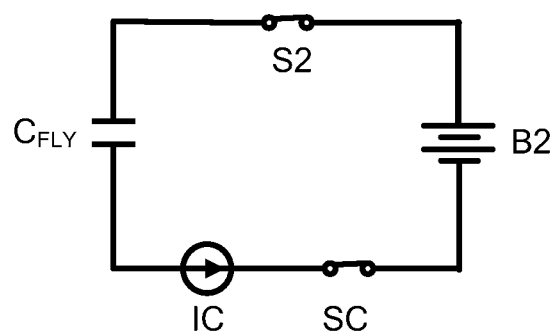

FIG. 6(a)~6(c) and FIG. 7(a)~7(c) illustrate the control scheme and the operation of the battery balancing circuit 400 working in the non-starting phase when the voltage difference between the first battery unit B1 and the second battery unit B2 is larger than a current limiting threshold. More specifically, FIG. 6(a)~6(c) illustrate the control scheme and the operation of the battery balancing circuit 400 working in the non-starting phase when the voltage of the first battery unit B1 is larger than the voltage of the second battery unit B2 and when the voltage difference between the first battery unit B1 and the second battery unit B2 is larger than the current limiting threshold. FIG. 7(a) ~7(c) illustrate the control scheme and the operation of the battery balancing circuit 400 working in the non-starting phase when the voltage of the second battery unit B2 is larger than the voltage of the first battery unit B1 and when the voltage difference between the second battery unit B2 and the first battery unit B1 is larger than the current limiting threshold.

As shown in FIG. 6(a) and FIG. 6(b), when the voltage of the first battery unit B1 is larger than the voltage of the second battery unit B2 and when the voltage difference between the first battery unit B1 and the second battery unit B2 is larger than the current limiting threshold, in the first time period T1 of each switching cycle in the non-starting phase, the switches S3 and SB are turned on and the switches S1, S2, S4, SA, SC and SD are all turned off so that the first battery unit B1 charges the fly capacitor $C_{FLY}$ with a charging current value of which is determined by the current source IB. In this way, the voltage $V_{FLY}$ of the fly capacitor $C_{FLY}$ becomes equal to the voltage VBA of the first battery unit B1 at the end of the first time period T1. And next, as shown in FIG. 6(a) and FIG. 6(c), in the second time period T2 of the first switching cycle of the non-starting phase, the switches S2 and SD are turned on and the switches S1, S3, S4, SA, SB and SC are all turned off so that the fly capacitor $C_{FLY}$ charges the second battery unit B2 with a charging current value of which is determined by the current source ID. In this way, the voltage $V_{FLY}$ of the fly capacitor $C_{FLY}$ becomes equal to the voltage $V_{B2}$ of the second battery unit B2 at the end of the first time period T2.

As shown in FIG. 6(a) and FIG. 6(c), in the second time period T2 of each switching cycle in the starting phase, the switches S2 and SC are turned on and the switches S1, S3, S4, SA, SB and SD are all turned off so that the second battery unit B2 charges the fly capacitor $C_{FLY}$ with a charging current value of which is determined by the current source IC.

In this way, in the non-starting phase, when the voltage of the first battery unit B1 is larger than the voltage of the second battery unit B2 and the voltage difference of between the first battery unit B1 and the second battery unit B2 is larger than the current limiting threshold, the power is transferred from the first battery unit B1 to the second battery unit B2 by charging the fly capacitor $C_{FLY}$ with the first battery unit B1 and then discharging the second battery unit B2 to the fly capacitor $C_{FLY}$, making the voltage difference between the first battery unit B1 and the second battery unit B2 decreasing gradually. Further, the current overshooting event can be avoided due to the current limiting function of the current sources IB and ID.

In contrast to the control scheme and the operation when the voltage of the first battery unit B1 is larger than the voltage of the second battery unit B2, 7(a)~7(c) illustrate the control scheme and the operation of the battery balancing circuit 400 working in the non-starting phase when the voltage of the second battery unit B2 is larger than the voltage of the first battery unit B1 and when the voltage difference between the second battery unit B2 and the first battery unit B1 is larger than the current limiting threshold. As shown in FIG. 7(a) and FIG. 7(b), when the voltage of the second battery unit B2 is larger than the voltage of the first battery unit B1 and when the voltage difference between the second battery unit B2 and the first battery unit B1 is larger than the current limiting threshold, in the first time period T1 of each switching cycle in the non-starting phase, the switches S3 and SA are turned on and the switches S1, S2, S4, SB, SC and SD are all turned off so that the fly capacitor $C_{FLY}$ charges the first battery unit B1 with a charging current value of which is determined by the current source IA. In this way, the voltage VBA of the first battery unit B1 becomes equal to the voltage $V_{FLY}$ of the fly capacitor $C_{FLY}$ at the end of the first time period T1. And next, as shown in FIG. 7(a) and FIG. 7(c), in the second time period T2 of the first switching cycle of the non-starting phase, the switches S2 and SC are turned on and the switches S1, S3, S4, SA, SB and SD are all turned off so that the second battery unit B2 charges the fly capacitor $C_{FLY}$ with a charging current value of which is determined by the current source IC. In this way, the voltage $V_{FLY}$ of the fly capacitor $C_{FLY}$ becomes equal to the voltage $V_{B2}$ of the second battery unit B2 at the end of the first time period T2.

In this way, in the non-starting phase, when the voltage of the second battery unit B2 is larger than the voltage of the first battery unit B1 and the voltage difference of between the second battery unit B2 and the first battery unit B1 is larger than the current limiting threshold, the power is transferred from the second battery unit B2 to the first battery unit B1 by charging the first battery unit B1 with the fly capacitor $C_{FLY}$ and then discharging the fly capacitor $C_{FLY}$ to the second battery unit B2, making the voltage difference between the second battery unit B2 and the first battery unit B1 decreasing gradually. Further, the current overshooting event can be avoided due to the current limiting function of the current sources IA and IC.

Persons of ordinary skills in the art will recognize that, in an embodiment, the sub-phase of the non-starting phase when the voltage difference between the first battery unit B1 and the second battery unit B2 may comprise several switching cycles, and a judging condition may be set to judge whether the sub-phase ends. For example, the voltage difference between the first battery unit B1 and the second battery unit B2 may be detected, and the sub-phase ends when the voltage difference is lower than the current limiting threshold.

Persons of ordinary skill in the art will also recognize that, in the embodiments illustrated by FIG. 6(a)~6(c) and by FIG. 7(a)~7(c), the fly capacitor $C_{FLY}$ is first charged by one battery unit between the first battery unit B1 and the second battery unit B2 with a higher voltage value, and then by the other battery unit with a lower voltage value. However, this should not be interpreted to limit the present invention. In one embodiment, the fly capacitor $C_{FLY}$ may be coupled to any one of the first battery unit B1 and the second battery unit B2 first and then to the other one.

It can be known from the above description, by setting the currents provided the current sources IA~ID properly, the current overshooting event can be avoided effectively in the discharging loop.

When the voltage difference between the first battery unit B1 and the second battery unit B2 is lower than the current limiting threshold, the control scheme and the operation of the battery balancing circuit is similar to that of the circuits illustrated in the embodiments of FIG. 3(a)~e(b). That is, the switches S1 and S3 are turned on and the other switches are all turned off so that the fly capacitor $C_{FLY}$ is coupled with first battery unit B1 in parallel, and the switches S2 and S4 are turned on and the other switches are all turned off so that the fly capacitor $C_{FLY}$ is coupled with the second battery unit B2 in parallel. As a result, the power is transferred from the battery unit with a higher voltage value to the battery unit with a lower voltage value. In this way, the charging and discharging operation between the fly capacitor $C_{FLY}$ and the battery unit walks around the current limiting path comprising the current source, the charging and discharging efficiency is thus improved. And further, the current overshooting event will be efficiently avoided as the voltage difference between the fly capacitor $C_{FLY}$ and the battery unit is relatively small.

The battery balancing circuit of the present invention can be used to balance N serially coupled battery units. In this situation, every two adjacent battery units are coupled to a fly capacitor $C_{FLY}$, and the two adjacent battery units can be balanced with the charging and discharging operation of the fly capacitor $C_{FLY}$. In other words, a battery balancing circuit as shown in the embodiment of FIG. 1 is formed to every two adjacent battery units. And for the N serially coupled battery unit, (N−1) battery balancing circuits are formed.

Figure 8:
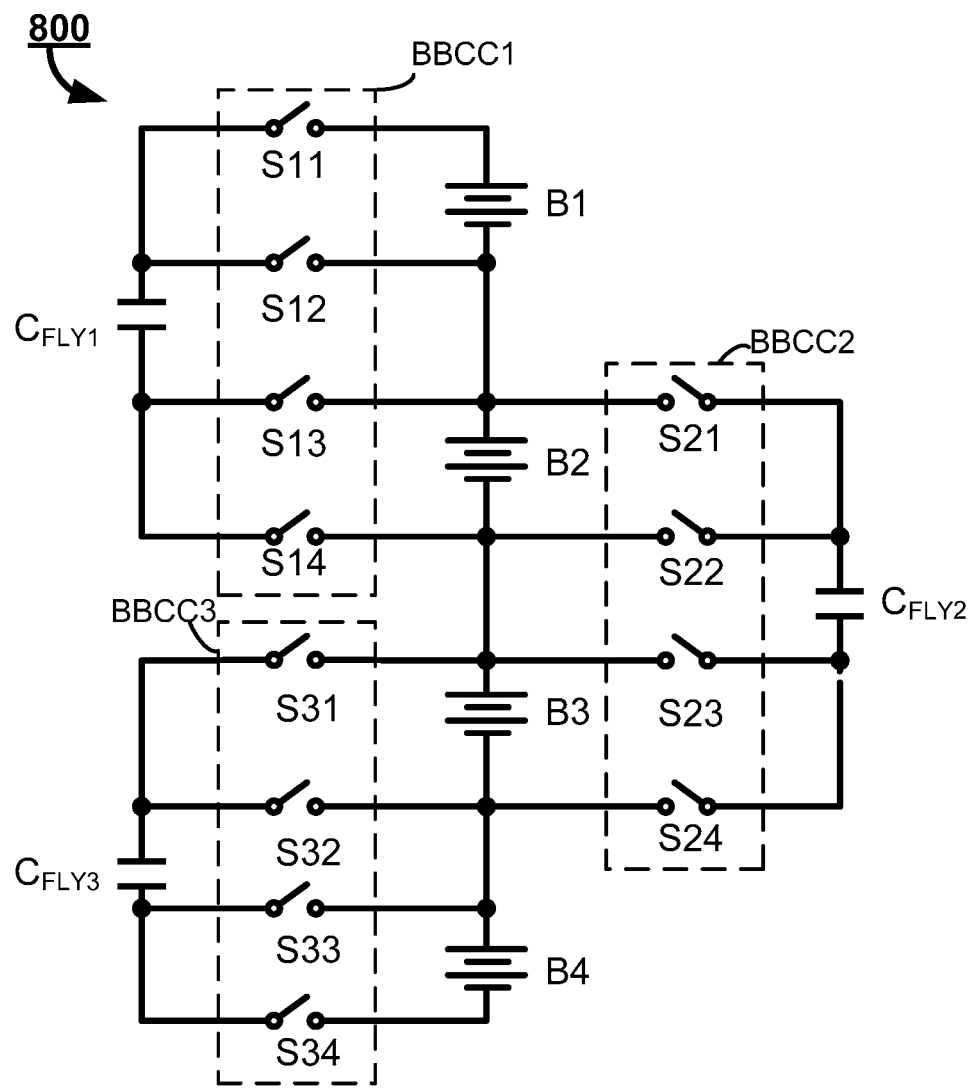
FIG. 8 illustrates a battery balancing circuit 800 comprising four serially coupled battery units in accordance with an embodiment of the present invention, so as to explain the configuration and the operation of the battery balancing circuit comprising N (N>2) serially coupled battery units.

FIG. 8 illustrates a battery balancing circuit 800 comprising four serially coupled battery units in accordance with an embodiment of the present invention, so as to explain the configuration and the operation of the battery balancing circuit comprising N (N>2) serially coupled battery units. As shown in FIG. 8, the battery balancing circuit 800 is illustrated to comprise the serially coupled battery units B1~B4, the fly capacitors $C_{FLY1}$~$C_{FLY3}$, and the battery balancing control circuit BBCC1~BBCC3. The fly capacitor $C_{FLY1}$, the battery balancing control circuit BBCC1 and the battery units B1 and B2 are coupled together to form a battery balancing circuit unit as shown in FIG. 2; the fly capacitor $C_{FLY2}$, the battery balancing control circuit BBCC2 and the battery units B2 and B3 are coupled together to form a battery balancing circuit unit as shown in FIG. 2; the fly capacitor $C_{FLY3}$, the battery balancing control circuit BBCC3 and the battery units B3 and B4 are coupled together to form a battery balancing circuit unit as shown in FIG. 2. Being similar to the operation of the battery balancing circuit 200 of FIG. 2, each battery balancing circuit unit of FIG. 8 can be used to balance the two adjacent battery units thereof. Persons of ordinary skill in the art will recognize that, with the function of every battery balancing circuit unit and an algorithm set by other circuits, the balance of all the battery units B1~B4 of FIG. 8 can be achieved, making the voltages of all the battery units B1~B4 equal. The detailed technique scheme will not be described herein for simplicity reason.

In the battery balancing circuit 800, with the charging and discharging operations of the fly capacitor $C_{FLY1}$, the battery units B1 and B2 are balanced; with the charging and discharging operations of the fly capacitor $C_{FLY2}$, the battery units B2 and B3 are balanced; with the charging and discharging operations of the fly capacitor $C_{FLY3}$, the battery units B3 and B4 are balanced.

Figure 9:
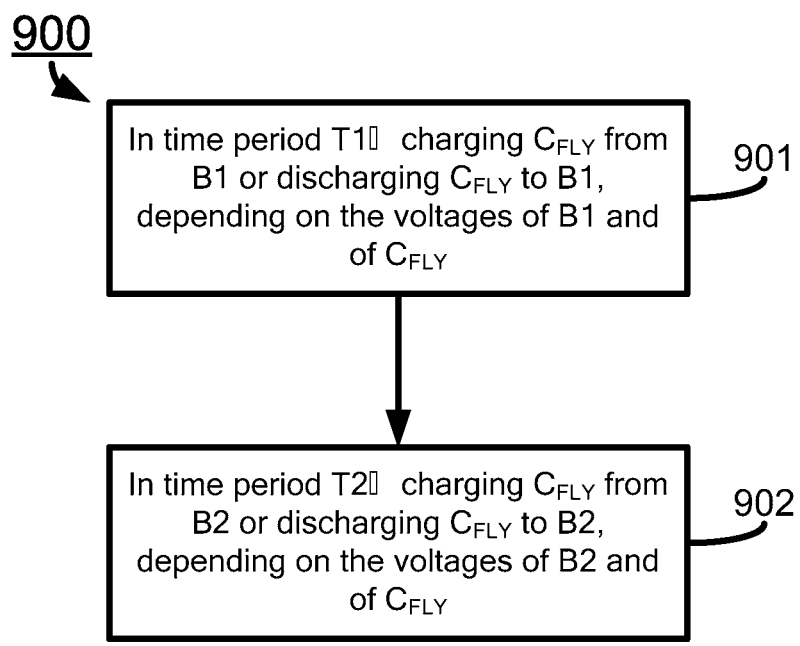
FIG. 9 illustrates a battery balancing method 900 in accordance with an embodiment of the present invention.

FIG. 9 illustrates a battery balancing method 900 in accordance with an embodiment of the present invention. When the voltage of the first battery unit B1 is not equal to the voltage of the second battery unit B2, that is, the voltages of the first battery unit B1 and of the second battery unit B2 are imbalanced, the battery balancing method 900 balances the first battery unit B1 and the second battery unit B2 with a fly capacitor $C_{FLY}$ so that the voltages of the first battery unit B1 and the second battery unit B2 become equal. As shown in FIG. 9, the battery balancing method 900 illustratively comprise steps 901 and 902. In step 901, in the first time period T1 of each switching cycle, the first battery unit B1 operates to charge the fly capacitor $C_{FLY}$ or the fly capacitor $C_{FLY}$ operates to charge the first battery unit B1, depending on which of the first battery unit B1 and the fly capacitor $C_{FLY}$ has a larger voltage value. In step 902, in the first time period T2 of each switching cycle, the second battery unit B2 operates to charge the fly capacitor $C_{FLY}$ or the fly capacitor $C_{FLY}$ operates to charge the second battery unit B2, depending on which of the second battery unit B2 and the fly capacitor $C_{FLY}$ has a larger voltage value.

It can be known from the above description, the power energy is transferred between the second battery unit B2 and the first battery unit B1 with the function of the fly capacitor $C_{FLY}$, as a result, the voltage difference between the first battery unit B1 and the second battery unit B2 decreases gradually, and becomes to zero eventually, that is, the voltage of the first battery unit B1 becomes equal to the voltage of the second battery unit B2.

More specifically, in the first time period T1 of each switching cycle, the first battery unit B1 operates to charge the fly capacitor $C_{FLY}$ when the voltage value of the first battery unit B1 is larger than the voltage value of fly capacitor $C_{FLY}$ or the fly capacitor $C_{FLY}$ operates to discharge the first battery unit B1 when the voltage value of the first battery unit B1 is lower than the voltage value of fly capacitor $C_{FLY}$. In the second time period T2 of each switching cycle, the second battery unit B2 operates to charge the fly capacitor $C_{FLY}$ when the voltage value of the second battery unit B2 is larger than the voltage value of fly capacitor $C_{FLY}$ or the fly capacitor $C_{FLY}$ operates to discharge the second battery unit B2 when the voltage value of the second battery unit B2 is lower than the voltage value of fly capacitor $C_{FLY}$.

In an embodiment, each switching cycle comprises the first time period T1 and the second time period T2. While in another embodiment, each switching cycle is consisted of the first time period T1 and the second time period T2.

In an embodiment, the balancing operation in the battery balancing method 900 of FIG. 9 comprises a starting phase and a non-starting phase. In the starting phase, the voltages of the first battery unit B1 and of the second battery unit B2 are much larger than the voltage of the fly capacitor $C_{FLY}$. In the starting phase, in the first time period T1 of each switching cycle, the first battery unit B1 operates to charge the fly capacitor $C_{FLY}$; in the second time period T2 of each switching cycle, the second battery unit B2 operates to charge the fly capacitor $C_{FLY}$.

Persons of ordinary skills in the art will recognize that, in an embodiment, for each switching cycle in the starting phase, the durations of the first time period T1 and the second time period T2 may be preset in accordance with the design requirements. Persons of ordinary skill in the art will also recognize that, in an embodiment, the end of the staring phase may be judged by setting a judging condition. For example, in an embodiment, the number of the switching cycles of the starting phase may be set, and when the number the switching cycle completes, the starting phase ends. In another embodiment, the voltage difference between the fly capacitor $C_{FLY}$ and the first battery unit B1 and the voltage difference between the fly capacitor $C_{FLY}$ and the second battery unit B2 are detected, and when the larger one of the above two voltage differences reaches a preset value, the starting phase ends.

In the non-starting phase, the battery balancing method 900 makes the voltage of the first battery unit B1 being equal to the voltage of the fly capacitor $C_{FLY}$ at the end of the first time period T1 of each switching cycle and the voltage of the second battery unit B2 being equal to the voltage of the fly capacitor $C_{FLY}$ at the end of the second time period T2 of each switching cycle. In an embodiment, the non-starting phase is immediately entered after the starting phase. In another embodiment, the non-starting phase is entered when the larger one of the voltage difference between the fly capacitor $C_{FLY}$ and the first battery unit B1 and the voltage difference between the fly capacitor $C_{FLY}$ and the second battery unit B2 reaches a preset value.

In an embodiment, the non-starting phase of the battery balancing method 900 of FIG. 9 may comprise two situations. When the voltage difference between the first battery unit B1 and the second battery B2 is larger than the current limiting threshold, in the first time period T1 of each switching cycle, the charging current with which the first battery unit B1 charges the fly capacitor $C_{FLY}$ and the discharging current with which the fly capacitor $C_{FLY}$ discharges the first battery unit B1 are both preset; in the second time period T2 of each switching cycle, the charging current with which the second battery unit B2 charges the fly capacitor $C_{FLY}$ and the discharging current with which the fly capacitor $C_{FLY}$ discharges the second battery unit B2 are both preset. When the voltage difference between the first battery unit B1 and the second battery unit B2 is lower than the current limiting threshold, in the first time period T1 of each switching cycle, the first battery unit B1 is coupled with the fly capacitor $C_{FLY}$ in parallel; in the second time period T2 of each switching cycle, the second battery unit B2 is coupled with the fly capacitor $C_{FLY}$ in parallel. In this way, when the voltage difference between the first battery unit B1 and the second battery unit B2 is larger than the current limiting threshold, the current limiting operation is adopted in the non-starting phase in the battery balancing method 900, so as to present the current overshooting event; and when the voltage difference between the first battery unit B1 and the second battery unit B2 is lower than the current limiting threshold, the non-current limiting operation is adopted in the non-starting phase in the battery balancing method 900, so as to improve the operating efficiency.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. A battery balancing method for balancing the voltages of a first battery unit and of a second battery unit with a fly capacitor, wherein the operation of balancing the voltages of the first battery unit and of the second battery unit with the fly capacitor comprises a non-starting phase, the battery balancing method comprising:
   in a first time period of a switching cycle, charging the fly capacitor from the first battery unit or discharging the fly capacitor to the first battery unit, depending on which of the first battery unit and the fly capacitor having a larger voltage value;
   in a second time period of the switching cycle, charging the fly capacitor from the second battery unit or discharging the fly capacitor to the second battery unit, depending on which of the second battery unit and the fly capacitor having a larger voltage value; and
   in the non-starting phase, when a voltage difference between the voltage of the first battery unit and the voltage of the second battery unit is larger than a current limiting threshold, a charging current with which the first battery unit charges the fly capacitor and a discharging current with which the first battery unit discharges the fly capacitor are both preset by being provided from current sources in the first time period of each switching cycle, and a charging current with which the second battery unit charges the fly capacitor and a discharging current with which the second battery unit discharges the fly capacitor are both preset by being provided from current sources in the second time period of each switching cycle.

2. The battery balancing method of claim 1, wherein the operation of balancing the voltages of the first battery unit and of the second battery unit with the fly capacitor further comprises a starting phase, and the battery balancing method further comprises:
   in the starting phase, charging the fly capacitor from the first battery unit in the first time period of each switching cycle and charging the fly capacitor from the second battery unit in the second time period of each switching cycle; and
   in the non-starting phase, having the voltage of the first battery unit becoming equal to the voltage of the fly capacitor at the end of the first time period of each switching cycle and having the voltage of the second battery unit becoming equal to the voltage of the fly capacitor at the end of the second time period of each switching cycle.

3. The battery balancing method of claim 2, wherein in the non-starting phase,
   when the voltage difference between the voltage of the first battery unit and the voltage of the second battery unit is lower than the current limiting threshold, the first battery unit is coupled with the fly capacitor in parallel in the first time period of each switching cycle, and the second battery unit is coupled with the fly capacitor in parallel in the second time period of each switching cycle.

4. The battery balancing method of claim 1, wherein each switching circuit consists of the first time period and the second time period.

5. A battery balancing control circuit for balancing the voltages of a first battery unit and of a second battery unit with a fly capacitor, wherein the first battery unit, the second battery unit and the fly capacitor each comprises a first terminal and a second terminal, and wherein the first terminal of the second battery unit is electrically coupled to the second terminal of the first battery unit, the battery balancing control circuit comprising:
   a first switching circuit and a second switching circuit, wherein the first switching circuit comprises a first switch, a second switch, a first current source, a first controllable switch, a second current source and a second controllable switch, and the second switching circuit comprises a third switch, a fourth switch, a third current source, a third controllable switch, a fourth current source and a fourth controllable switch, and wherein
      the first switch is electrically coupled between the first terminal of the fly capacitor and the first terminal of the first battery unit;
      the second switch is electrically coupled between the second terminal of the fly capacitor and the second terminal of the first battery unit;
      the third switch is electrically coupled between the first terminal of the fly capacitor and the first terminal of the second battery unit;
      the fourth switch is electrically coupled between the second terminal of the fly capacitor and the second terminal of the second battery unit;
      the first current source and the first controllable switch are serially coupled and the serially coupled first current source and first controllable switch are coupled between the first terminal of the fly capacitor and the first terminal of the first battery unit, and the first current source is configured to provide a current flowing from the first terminal of the fly capacitor to the first terminal of the first battery unit;
      the second current source and the second controllable switch are serially coupled and the serially coupled second current source and second controllable switch are coupled between the first terminal of the fly capacitor and the first terminal of the first battery unit, and the second current source is configured to provide a current flowing from the first terminal of the first battery unit to the first terminal of the fly capacitor;
      the third current source and the third controllable switch are serially coupled and the serially coupled third current source and third controllable switch are coupled between the second terminal of the fly capacitor and the second terminal of the second battery unit, and the third current source is configured to provide a current flowing from the second terminal of the fly capacitor to the second terminal of the second battery unit; and
      the fourth current source and the fourth controllable switch are serially coupled and the serially coupled fourth current source and fourth controllable switch are coupled between the second terminal of the fly capacitor and the second terminal of the second battery unit, and the fourth current source is configured to provide a current flowing from the second terminal of the second battery unit to the second terminal of the fly capacitor;
   and wherein
      in a first time period of a switching cycle, the first switching circuit is switched on and the second switching circuit is switched off so as to charge the fly capacitor from the first battery unit or to discharge the fly capacitor to the first battery unit, depending on which of the first battery unit and the fly capacitor having a larger voltage value; and in a second time period of the switching cycle, the first switching circuit is switched off and the second switching circuit is switched on so as to charge the fly capacitor from the second battery unit or to discharge the fly capacitor to the second battery unit, depending on which of the second battery unit and the fly capacitor having a larger voltage value.

6. The battery balancing control circuit of claim 5, wherein in the first time period of each switching cycle, the first switching circuit is switched on and the second switching circuit is switched off so as to charge the fly capacitor from the first battery unit when the voltage of the first battery unit is larger than the voltage of the fly capacitor or to discharge the fly capacitor to the first battery unit when the voltage of the first battery unit is lower than the voltage of the fly capacitor; and in the second time period of each switching cycle, the first switching circuit is switched off and the second switching circuit is switched on so as to charge the fly capacitor from the second battery unit when the voltage of the second battery unit is larger than the voltage of the fly capacitor or to discharge the fly capacitor to the second battery unit when the voltage of the second battery unit is lower than the voltage of the fly capacitor.

7. The battery balancing control circuit of claim 5, wherein the operation of balancing the voltages of the first battery unit and of the second battery unit with the fly capacitor comprises a starting phase and a non-starting phase, and wherein, in the starting phase, the fly capacitor is charged by the first battery unit in the first time period of each switching cycle, and the fly capacitor is charged by the second battery unit in the second time period of each switching cycle; and in the non-starting phase, the voltage of the first battery unit is balanced to be equal to the voltage of the fly capacitor at the end of the first time period of each switching cycle, and the voltage of the second battery unit is balanced to be equal to the voltage of the fly capacitor at the end of the second time period of each switching cycle.

8. The battery balancing control circuit of claim 5, wherein the operation of balancing the voltages of the first battery unit and of the second battery unit with the fly capacitor comprises a starting phase and a non-starting phase, and wherein in the starting phase, a conducting path comprising the second current source is formed within the first switching circuit so as to charge the fly capacitor from the first battery unit in the first time period of each switching cycle; a conducting path comprising the third current source is formed within the second switching circuit so as to charge the fly capacitor from the second battery unit in the second time period of each switching cycle; and in the non-starting phase, when a voltage difference between the voltage of the first battery unit and the voltage of the second battery unit is larger than a current limiting threshold, a conducting path comprising the second current source or the first current source is formed within the first switching circuit in the first time period of each switching cycle so as to have the voltage of the first battery unit becoming equal to the voltage of the fly capacitor at the end of the first time period; a conducting path comprising the third current source or the fourth current source is formed within the second switching circuit in the second time period of each switching cycle so as to have the voltage of the second battery unit becoming equal to the voltage of the fly capacitor at the end of the second time period; and when the voltage difference between the voltage of the first battery unit and the voltage of the second battery unit is lower than the current limiting threshold, the first switch is switched on to form a conducting path within the first switching circuit in the first time period of each switching cycle so as to have the voltage of the first battery unit becoming equal to the voltage of the fly capacitor at the end of the first time period; the fourth switch is switched on to form a conducting path within the second switching circuit in the second time period of each switching cycle so as to have the voltage of the second battery unit becoming equal to the voltage of the fly capacitor at the end of the second time period.

9. The battery balancing control circuit of claim 5, wherein each switching circuit consists of the first time period and the second time period.

10. A battery balancing circuit, comprising:

a first battery unit and a second battery unit, wherein the first battery unit and the second battery unit each comprises a first terminal and a second terminal, and the first terminal of the second battery unit is electrically coupled to the second terminal of the first battery unit;

a fly capacitor, wherein the battery balancing circuit is configured to balance the voltages of the first battery unit and of the second battery unit with the fly capacitor, and wherein the fly capacitor comprises a first terminal and a second terminal; and a battery balancing control circuit configured to comprise a first switching circuit and a second switching circuit, wherein the first switching circuit comprises a first switch, a second switch, a first current source, a first controllable switch, a second current source and a second controllable switch, and the second switching circuit comprises a third switch, a fourth switch, a third current source, a third controllable switch, a fourth current source and a fourth controllable switch, and wherein the first switch is electrically coupled between the first terminal of the fly capacitor and the first terminal of the first battery unit;

the second switch is electrically coupled between the second terminal of the fly capacitor and the second terminal of the first battery unit;

the third switch is electrically coupled between the first terminal of the fly capacitor and the first terminal of the second battery unit;

the fourth switch is electrically coupled between the second terminal of the fly capacitor and the second terminal of the second battery unit;

the first current source and the first controllable switch are serially coupled and the serially coupled first current source and first controllable switch are coupled between the first terminal of the fly capacitor and the first terminal of the first battery unit, and the first current source is configured to provide a current flowing from the first terminal of the fly capacitor to the first terminal of the first battery unit;

the second current source and the second controllable switch are serially coupled and the serially coupled second current source and second controllable switch are coupled between the first terminal of the fly capacitor and the first terminal of the first battery unit, and the second current source is configured to provide a current flowing from the first terminal of the first battery unit to the first terminal of the fly capacitor;

the third current source and the third controllable switch are serially coupled and the serially coupled third current source and third controllable switch are coupled between the second terminal of the fly capacitor and the second terminal of the second battery unit, and the third current source is configured to provide a current flowing from the second terminal of the fly capacitor to the second terminal of the second battery unit; and the fourth current source and the fourth controllable switch are serially coupled and the serially coupled fourth current source and fourth controllable switch are coupled between the second terminal of the fly capacitor and the second terminal of the second battery unit, and the fourth current source is configured to provide a current flowing from the second terminal of the second battery unit to the second terminal of the fly capacitor;

and wherein in a first time period of a switching cycle, the first switching circuit is switched on and the second switching circuit is switched off so as to charge the fly capacitor from the first battery unit or to discharge the fly capacitor to the first battery unit, depending on which of the first battery unit and the fly capacitor having a larger voltage value; and in a second time period of the switching cycle, the first switching circuit is switched off and the second switching circuit is switched on so as to charge the fly capacitor from the second battery unit or to discharge the fly capacitor to the second battery unit, depending on which of the second battery unit and the fly capacitor having a larger voltage value.

11. The battery balancing circuit of claim 10, wherein in the first time period of each switching cycle, the first switching circuit is switched on and the second switching circuit is switched off so as to charge the fly capacitor from the first battery unit when the voltage of the first battery unit is larger than the voltage of the fly capacitor or to discharge the fly capacitor to the first battery unit when the voltage of the first battery unit is lower than the voltage of the fly capacitor; and in the second time period of each switching cycle, the first switching circuit is switched off and the second switching circuit is switched on so as to charge the fly capacitor from the second battery unit when the voltage of the second battery unit is larger than the voltage of the fly capacitor or to discharge the fly capacitor to the second battery unit when the voltage of the second battery unit is lower than the voltage of the fly capacitor.

12. The battery balancing circuit of claim 10, wherein the operation of balancing the voltages of the first battery unit and of the second battery unit with the fly capacitor comprises a starting phase and a non-starting phase, and wherein, in the starting phase, the fly capacitor is charged by the first battery unit in the first time period of each switching cycle, and the fly capacitor is charged by the second battery unit in the second time period of each switching cycle; and in the non-starting phase, the voltage of the first battery unit is balanced to be equal to the voltage of the fly capacitor at the end of the first time period of each switching cycle, and the voltage of the second battery unit is balanced to be equal to the voltage of the fly capacitor at the end of the second time period of each switching cycle.

13. The battery balancing circuit of claim 10, wherein the operation of balancing the voltages of the first battery unit and of the second battery unit with the fly capacitor comprises a starting phase and a non-starting phase, and wherein in the starting phase, a conducting path comprising the second current source is formed within the first switching circuit so as to charge the fly capacitor from the first battery unit in the first time period of each switching cycle; a conducting path comprising the third current source is formed within the second switching circuit so as to charge the fly capacitor from the second battery unit in the second time period of each switching cycle; and in the non-starting phase, when a voltage difference between the voltage of the first battery unit and the voltage of the second battery unit is larger than a current limiting threshold, a conducting path comprising the second current source or the first current source is formed within the first switching circuit in the first time period of each switching cycle so as to have the voltage of the first battery unit becoming equal to the voltage of the fly capacitor at the end of the first time period; a conducting path comprising the third current source or the fourth current source is formed within the second switching circuit in the second time period of each switching cycle so as to have the voltage of the second battery unit becoming equal to the voltage of the fly capacitor at the end of the second time period; and when the voltage difference between the voltage of the first battery unit and the voltage of the second battery unit is lower than the current limiting threshold, the first switch is switched on to form a conducting path within the first switching circuit in the first time period of each switching cycle so as to have the voltage of the first battery unit becoming equal to the voltage of the fly capacitor at the end of the first time period; the fourth switch is switched on to form a conducting path within the second switching circuit in the second time period of each switching cycle so as to have the voltage of the second battery unit becoming equal to the voltage of the fly capacitor at the end of the second time period.

14. The battery balancing circuit of claim 10, wherein each switching circuit consists of the first time period and the second time period.

* * * * *